(No Model.)
F. DELLA TORRE.
AUTOMATIC LUBRICATOR FOR BICYCLES.
No. 566,147. Patented Aug. 18, 1896.
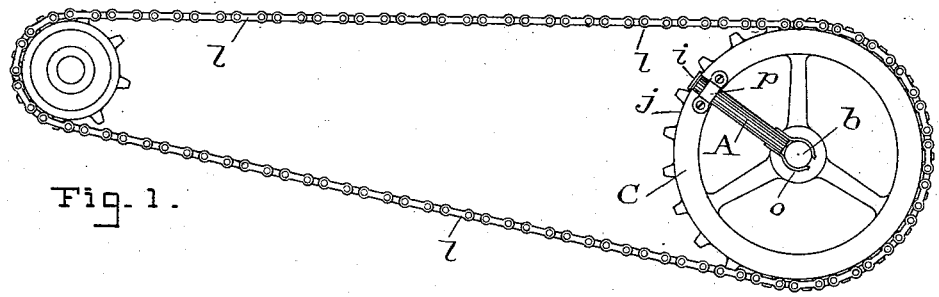
Fig. 1.
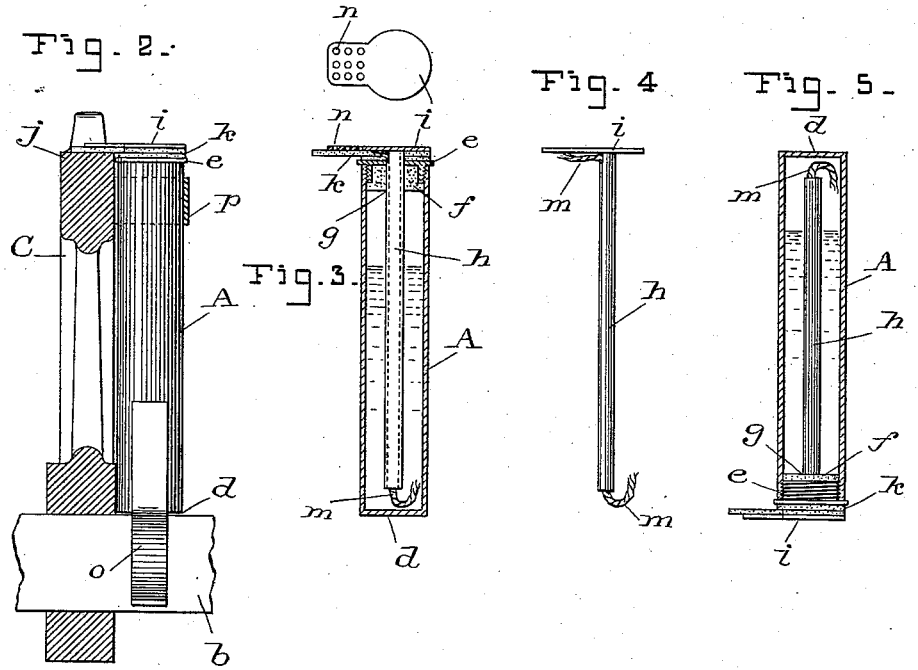
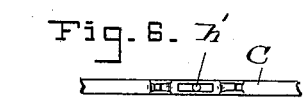
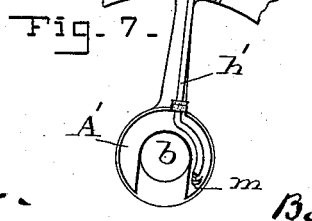
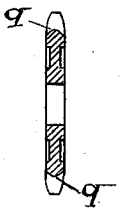
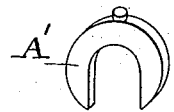
WITNESSES:
Lee J. Van Horn.
Charles B. Mann Jr.
INVENTOR:
Frank Della Torre
By Chas B. Mann
ATTORNEY.

UNITED STATES PATENT OFFICE.

FRANK DELLA TORRE, OF BALTIMORE, MARYLAND, ASSIGNOR OF ONE-HALF TO EDWARD HAMMOND, OF SAME PLACE.

AUTOMATIC LUBRICATOR FOR BICYCLES.

SPECIFICATION forming part of Letters Patent No. 566,147, dated August 18, 1896.

Application filed March 6, 1896. Serial No. 582,128. (No model.)

*To all whom it may concern:*

Be it known that I, FRANK DELLA TORRE, a citizen of the United States, residing at Baltimore, in the State of Maryland, have invented certain new and useful Improvements in Automatic Lubricators for Endless Chains, of which the following is a specification.

This invention relates to an automatic oiler or lubricator for the chains of bicycles.

One object of the invention is to provide a lubricating device connected with one of the sprocket-wheels and to so contrive the said lubricator device that in its operation each revolution of the sprocket-wheel will result in applying the lubricating material to one link of the chain, so that each revolution will lubricate only one link unless the device is adjusted for two links or more per revolution.

Another object is to provide a device for feeding the lubricant by capillary attraction and which in operation will disconnect the capillary medium from the supply of lubricant at each revolution of the sprocket-wheel.

The desideratum which my invention supplies is a mechanical device which will apply a minimum or minute quantity of lubricant to the links of a chain whenever the bicycle is running and which will avoid all approach to excessive lubrication.

In order to make the invention more clearly understood, I have shown in the accompanying drawings certain means for carrying the same into practical effect, without, however, intending to limit my invention to the particular construction which, for the sake of illustration, I have shown.

Figure 1 is a side view of the sprocket-wheels and chain of a bicycle, showing one form of my lubricator device. Fig. 2 shows a section of part of a sprocket-wheel and the form of lubricator seen in Fig. 1. Figs. 3, 4, and 5 show details of same. Fig. 6 shows an edge view of the bicycle sprocket-wheel. Fig. 7 shows a broken portion of a sprocket-wheel and a section of another form of my lubricator device. Fig. 8 shows a perspective view of the lubricator seen in Fig. 7. Fig. 9 shows a sectional view of the small sprocket-wheel.

The receptacle A for oil may have any preferred shape or form that will best adapt it for application to the sprocket-wheel at the particular location selected. In Figs. 1 to 5 the receptacle extends radially from the crank-shaft $b$ to the rim of the wheel C, and said section is tubular or cylindrical in shape. One end has a tight bottom $d$ and the other end is open and has a screw-thread and is closed by a screw-cap $e$, which carries on its inner side a cork $f$. The cap and cork have a central hole $g$, through which a small tube $h$ is inserted. In practice this tube should fit tightly in the hole in the cork to prevent leakage of oil. This tube extends into the oil-receptacle to near its bottom and the end of the tube is open. A thin plate $i$ is attached to the outer end of the tube and projects laterally, so as to take over the rim $j$ of the sprocket-wheel, and an absorbent pad $k$, of any suitable material, such as a piece of cloth or thin felt, is on the under side of the thin plate and between the plate and the cap $e$ and projects and rests directly on the rim of the wheel in position to be pressed by a link $l$ of the chain during the revolution of the wheel. That part of the thin plate $i$ which projects laterally has small perforations $n$, and the part which covers the end of the cylindric oil-receptacle is imperforate. The perforated portion is over that part of the pad $k$ which rests on the wheel-rim and the imperforate portion over that part of the pad which covers the cap $e$. The thin plate protects the absorbent pad.

The small tube $h$ contains a piece of yarn or cord $m$, which serves as a feeder—the oil passing up by the action of capillary attraction. One end of the yarn or cord projects out laterally through a hole in the tube adjoining the thin plate, and this end of the yarn connects with or laps onto the said absorbent pad. The other end of the yarn or cord projects out of the open end of the tube into the oil-receptacle A, as shown.

The oil-receptacle shown in the first five figures in the present instance has at its bottom a clip consisting of two leaf-springs $o$, one being at a side opposite the other and serving to grasp the crank-shaft $b$. Another clip, $p$, holds the top end confined against the side of the rim. The oil-absorbent pad is on the rim of the wheel, and whenever a link of the chain presses on this pad said link thereby receives lubrication.

In the operation of this oiler, when arranged as shown in the drawings, it will be seen that only one link of the chain (or the adjoining ends of two links) receives lubrication at each revolution of the sprocket-wheel. At every succeeding revolution of the wheel a different link will press on the oil-pad, and thus one link at a time is lubricated until all have received lubrication, and the operation is repeated.

The oil-receptacle is carried around by the wheel, and consequently is inverted or reversed at each revolution. When the receptacle is right side up, as in Fig. 3, the end of the feed-yarn is in the oil; but when the receptacle is inverted, as in Fig. 5, the end of the feed-yarn is out of the oil, and thus the capillary medium is disconnected from the supply of the lubricant at each revolution of the wheel.

It is immaterial what position the oil-receptacle may happen to have when the wheel is stored away and not in use, as no oil will waste or leak out whether it is right side up or inverted. Experience and use with this device have established the fact that the most minute quantity of oil is applied to a chain-link by the compression method here employed. A bicycle traveling three hundred miles will not consume more than a dram of oil, or sixty drops.

The construction shown in Figs. 6, 7, and 8 illustrates another form of my lubricator device. Here the oil-receptacle A' approximates the shape of the letter U and sits astride of the crank-shaft $b$, adjoining the sprocket-wheel C. A small tube $h'$ extends into the oil-receptacle and down one arm thereof to a point near the bottom. This end of the tube is open and the yarn or cord $m$ projects out. The rim of the wheel in this case has a slight cavity between two sprockets with edges undercut, and an absorbent pad $k'$ fits in said cavity. The small tube $h'$ extends from the oil-receptacle A' to the said pad, and the feed-yarn $m$ in the tube conveys the oil by capillary attraction from the receptacle to the pad. The operation of this modification is substantially the same as that already described for the construction shown in the other figures.

It should be stated that in the operation of the oiler when the bicycle is running at high speed a centrifugal action is brought into play which assists in feeding the lubricant more rapidly. In such case the centrifugal action affects only that oil in the small tube $h$ and does not affect that in the receptacle.

It is well known to riders of bicycles that under some conditions on the road dirt will accumulate by the action of the chain-links and become packed hard on the flat circumference of the rim of the sprocket-wheel. Both the small and large wheels are thus affected. Of course this dirt tightens the chain, but in addition to this the dirt absorbs the lubricant from the chain. To remedy this, I propose to have the circumferential rim rounded or beveled a little on each side to approximately a V shape, as indicated in Fig. 9, where the rounded-rim edge is designated by the letter $q$. With this shape, instead of flat, the chain-links will not pack the dirt.

Having thus described my invention, what I claim is—

1. In a bicycle, the combination with the endless chain and sprocket-wheel, of a receptacle to contain fluid lubricant and carried by said wheel; an absorbent pad on the said wheel-rim between two adjacent teeth thereon so as to apply lubricant to one link of the chain by the pressure of the link on said pad; and a tube having one end extending into said receptacle to near its bottom and the other end open adjacent said pad.

2. The combination of a sprocket-wheel and chain; an oil-receptacle connected with or carried by the sprocket-wheel and having an end adjacent the rim of the wheel; a cap closing one end of the receptacle; a pad taking on the wheel-rim in position to be pressed by a link of the chain; a plate connected with the receptacle and protecting said pad; and means for conveying oil from the receptacle to said pad.

3. The combination of a sprocket-wheel and chain; an oil-receptacle connected with or carried by the sprocket-wheel and having an end adjacent the rim of the wheel; a cap closing said end; a pad extending laterally from the receptacle and taking over the wheel-rim in position to be pressed by a link of the chain; a tube in the oil-receptacle extending to near its bottom and connecting through the cap; and a feed yarn or cord extending through the said tube to the said pad.

4. The combination of a sprocket-wheel; a lubricating-receptacle connected with or carried by the sprocket-wheel; a pad on the rim of the wheel in position to be pressed by a link of the chain; a tube extending into the receptacle to near its bottom and connecting from the said receptacle to the pad; and a feed yarn or cord extending through the tube.

5. A lubricator for bicycles, having, in combination, an oil-receptacle to be carried by the sprocket-wheel; a cap closing the receptacle; a pad attached to the receptacle and projecting laterally therefrom to take over the rim of the sprocket-wheel; and a small tube in said receptacle one end of which opens to the exterior and adjacent the pad and the other end extending to near the bottom and opening inside of the receptacle and through which lubricant is fed to the pad.

6. In a bicycle, the combination with the endless chain and sprocket-wheel, of a lubricant-receptacle carried by the wheel and having one end located adjacent the wheel-rim; a pad projecting laterally from said end and over the wheel-rim; a laterally-extending plate protecting the pad and provided with perforations through which oil may pass from the pad to the chain; and means for conveying the lubricant from the receptacle to the said pad.

7. In a bicycle, the combination of an endless chain and sprocket-wheel; a lubricant-receptacle carried by the said wheel; a screw-cap closing the outlet end of the receptacle and provided with packing, and an opening through both the cap and packing; a tube passed through the said opening in the cap and packing and held by friction and extending to near the bottom of the receptacle; a pad on the rim of the wheel; a plate attached to the outer end of the tube and in contact with the said pad; and a feed yarn or cord extending through said tube and conveying lubricant to said pad.

In testimony whereof I affix my signature in the presence of two witnesses.

FRANK DELLA TORRE.

Witnesses:
CHARLES B. MANN, Jr.,
C. CALVERT HINES.